(12) United States Patent
Kraus

(10) Patent No.: US 6,984,096 B2
(45) Date of Patent: Jan. 10, 2006

(54) DEVICE FOR CONNECTING A SUPPORT, ESPECIALLY A BODY PART OF A MOTOR VEHICLE, WITH A PANEL ELEMENT, ESPECIALLY A DOOR OR WALL PANELING

(75) Inventor: Willibald Kraus, Grünstadt (DE)

(73) Assignee: TRW Automotive Electronics & Components GmbH & Co. KG, (DE)

( * ) Notice: Subject to any disclaimer, the term of this patent is extended or adjusted under 35 U.S.C. 154(b) by 0 days.

(21) Appl. No.: 10/399,090

(22) PCT Filed: Oct. 9, 2001

(86) PCT No.: PCT/DE01/03829

§ 371 (c)(1),
(2), (4) Date: Aug. 25, 2003

(87) PCT Pub. No.: WO02/30710

PCT Pub. Date: Apr. 18, 2002

(65) Prior Publication Data

US 2004/0052609 A1    Mar. 18, 2004

(30) Foreign Application Priority Data

Oct. 10, 2000 (DE) .......................... 200 17 376 U

(51) Int. Cl.
   F16B 13/06    (2006.01)
   F16B 19/00    (2006.01)
(52) U.S. Cl. .................... 411/48; 411/508; 411/908; 411/60.1
(58) Field of Classification Search .............. 411/45, 411/48, 53, 338, 339, 508–510, 908, 408.1, 411/60.1; F16B 13/06, 19/00
See application file for complete search history.

(56) References Cited

U.S. PATENT DOCUMENTS

| | | | |
|---|---|---|---|
| 3,040,401 A * | 6/1962 | Von Rath | ..................... 24/297 |
| 4,568,215 A | 2/1986 | Nelson | |
| 4,810,147 A * | 3/1989 | Hirohata | ..................... 411/349 |
| 5,106,223 A * | 4/1992 | Kraus | .......................... 403/11 |
| 5,236,272 A | 8/1993 | Hibbard | |
| 5,319,839 A | 6/1994 | Shimajiri | |
| 5,507,610 A * | 4/1996 | Benedetti et al. | ........... 411/339 |
| 5,947,426 A * | 9/1999 | Kraus | ......................... 248/74.2 |
| 5,975,820 A * | 11/1999 | Kirchen | ...................... 411/339 |
| 6,039,523 A * | 3/2000 | Kraus | .......................... 411/48 |
| 6,254,302 B1 * | 7/2001 | Kraus | ......................... 403/326 |
| 6,264,393 B1 * | 7/2001 | Kraus | ......................... 403/282 |
| 6,287,043 B1 * | 9/2001 | Kraus | ......................... 403/297 |
| 6,336,768 B1 * | 1/2002 | Kraus | ........................ 403/408.1 |

FOREIGN PATENT DOCUMENTS

| | | |
|---|---|---|
| DE | 195 04 692 A1 | 8/1996 |
| DE | 297 18 487 U1 | 12/1997 |
| DE | 298 10 437 U1 | 10/1998 |

* cited by examiner

*Primary Examiner*—Katherine Mitchell
(74) *Attorney, Agent, or Firm*—Fay, Sharpe, Fagan, Minnich & McKee, LLP

(57) ABSTRACT

A device for connecting a support, with a panel element is provided including a connecting element (1) with an upper part (3) that can be fastened to the panel element, lower part (4) that can be linked with the support and a neck-shaped intermediate section (5) is provided with locking elements (10) and extends through an engaging element (12) that can be inserted ma support opening (7). The intermediate section (5) is enclosed by an intermediate element (15) and is lockable with the locking elements (10). A sealing element acts upon the upper side of the support (2). The intermediate section (5) is provided with a first zone I and a second zone II of the locking elements (10). In a pre-assembled state, the first zone I, and in an assembled state, the second zone II of the locking elements (10) is locked with the counterlocking elements (22) of the intermediate element (15). In the assembled state, the lower part (4) of the connecting element (1) simultaneously spreads apart the spreader elements (25) of the engaging element (12) in the area of the support opening (7).

20 Claims, 6 Drawing Sheets

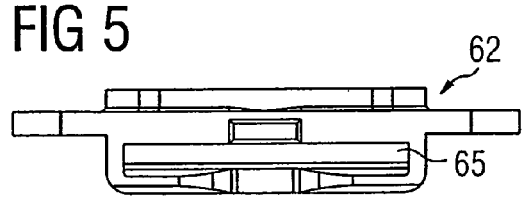
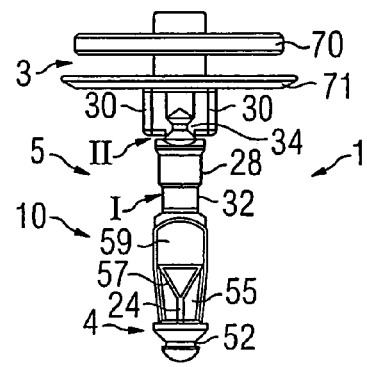
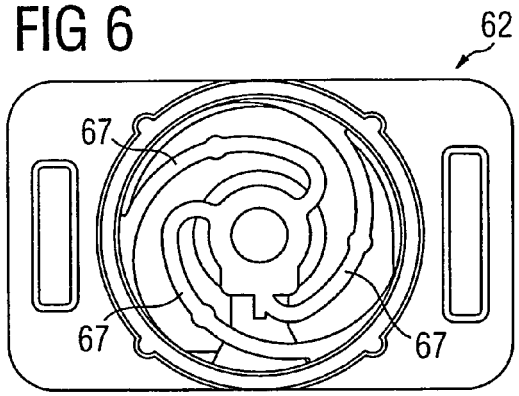
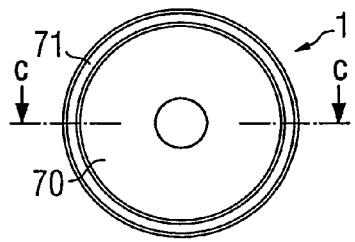
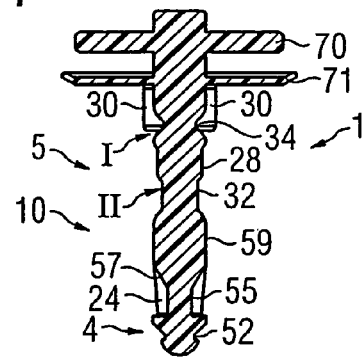

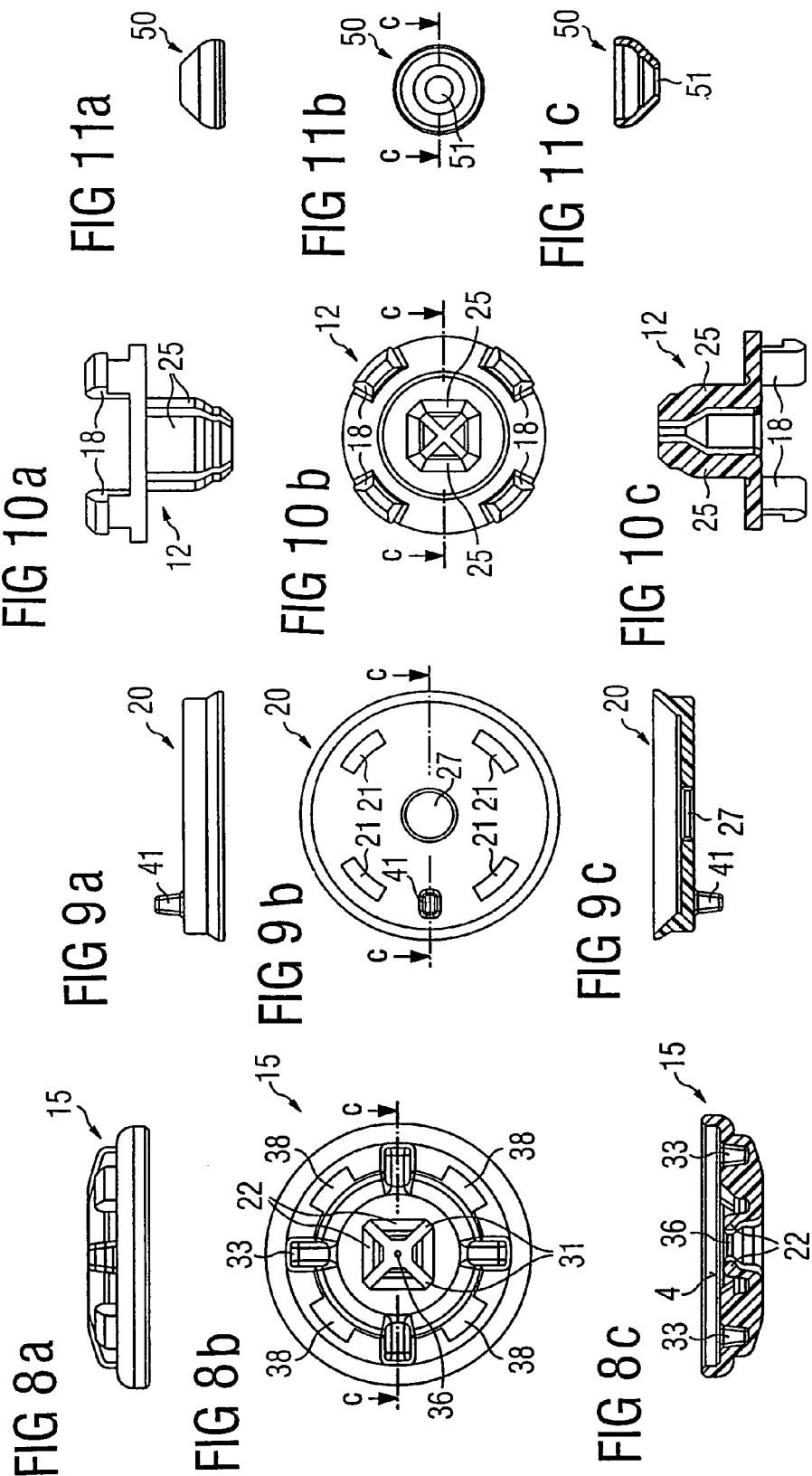

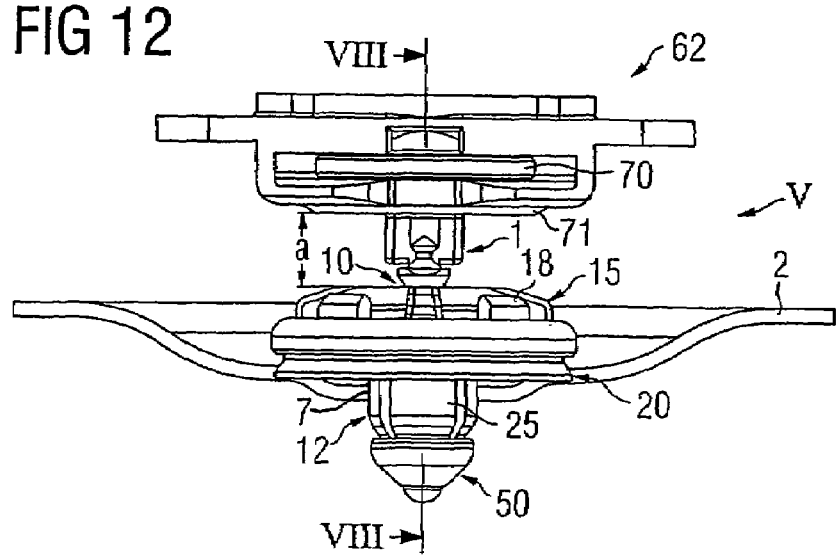
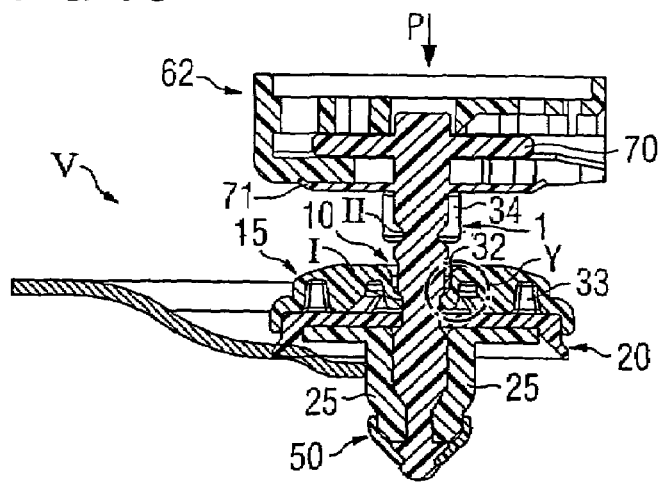
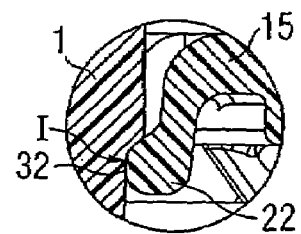

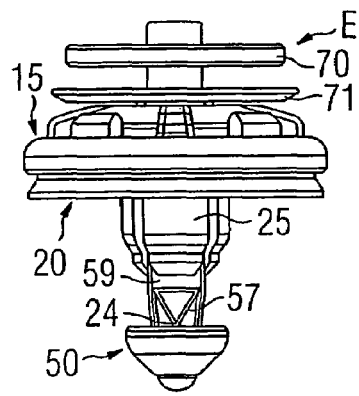
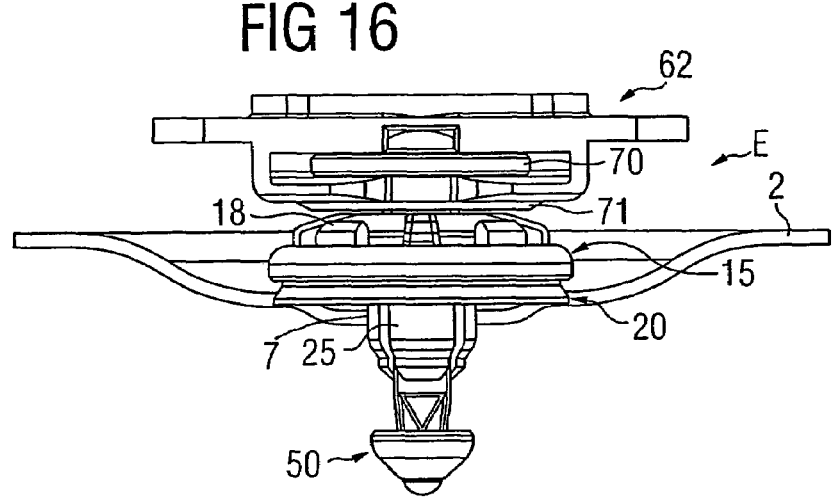
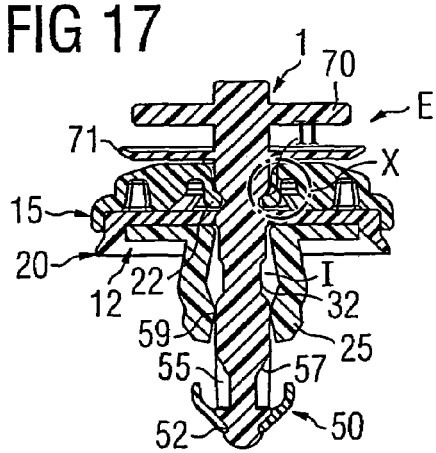
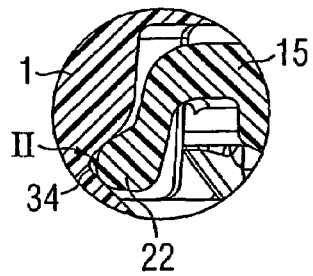

DEVICE FOR CONNECTING A SUPPORT, ESPECIALLY A BODY PART OF A MOTOR VEHICLE, WITH A PANEL ELEMENT, ESPECIALLY A DOOR OR WALL PANELING

BACKGROUND OF THE INVENTION

The subject invention is directed to a device for connecting a support, a body part of a motor vehicle for instance, with a panel element, a door or wall paneling for instance. The device comprises a connecting element with an upper part that can be fastened to the panel element, and with a lower part that can be linked with the support, whereby between the upper part and the lower part there is provided a neck-shaped intermediate section which is equipped with locking elements and which extends through an engaging element that can be inserted in a support opening.

One prior art device is described in German Patent DE 298 10 437. There, a connecting element, with respect to which the intermediate section above the support is surrounded by an intermediate part, which can be locked with the locking elements, whereby between the intermediate part and the engaging element there is arranged a sealing element which acts upon the top surface of the support.

Further state of the art is a connection between a support and a panel element, whereby the engaging section of the upper part consists of two pockets, arranged above each other and separated by a cross-piece. This is shown in German Patent DE 195 04 692 A1.

Moreover, another connection is known between a support and a panel element, with respect to which the holding element between the two flanges presents a third elastic flange. This is shown in German Patent DE 297 18 487 U1.

Starting from the above-described state of the art, it is an object of the present invention to provide a device for connecting a support with a panel element, with respect to which there exists a synchronization of installation and removal forces during assembly and/or disassembly. In other words, there is an assurance of fine-tuned synchronization in the assembly with the lowest possible scattering of forces.

SUMMARY OF THE INVENTION

The above object and others, according to the present invention, are solved in that the intermediate section of the connecting element presents a first section and a second section of the locking elements and that in the pre-assembly state, the first section and, in the post-assembly state, the second section of the locking elements is locked with counter locking elements of the intermediate part and that, in the final assembly, through the end section of the connecting element, spreader elements of the engaging element are simultaneously spread apart in the area of the support opening.

This results in a construction of simple design, which, nevertheless, ensures precise installation and removal forces during pre- and post-assembly, so that, consequently, the inventive device possesses, overall, a high degree of effectiveness.

In another embodiment of the invention, the first and the second section of the locking elements can respectively be designed as circumferential grooves, whereby the possibility exists that the first and the second sections are separated from each other by an intermediate neck.

According to another aspect of the invention, the connecting element in the second section of the locking elements can have at least two diagonally opposing cross-pieces, which are embedded in slots of the intermediate section during final assembly.

In addition, the intermediate section can be designed in the shape of a disc with a central section comprising counter-locking elements and disposed slots in the area of a passage opening therebetween for the intermediate section of the connecting element and with a circumferential section with diagonally opposing recesses.

Other advantages and benefits of the invention beyond those described above will become apparent to those skilled in the art upon a reading and understanding of the following detailed description.

BRIEF DESCRIPTION OF THE DRAWINGS

The invention may take physical form in certain parts and arrangement of parts, the preferred embodiments of which will be described in detail in this specification and illustrated in the accompanying drawings which form a part hereof, and wherein:

FIG. 5 is a lateral view of the locking elements in accordance with the device shown in FIG. 1;

FIG. 6 is a front elevational view of the locking elements shown in FIG. 5;

FIGS. 7a–7c are lateral, front elevational and cross sectional views, respectively, of a connecting element according to the present invention;

FIGS. 8a–8c are lateral, front elevational and cross sectional views, respectively, of an intermediate part according to the present invention;

FIGS. 9a–9c are lateral, front elevational and cross sectional views, respectively, of a sealing element according to the present invention;

FIGS. 10a–10c are lateral, front elevational and cross sectional views, respectively, of an engaging element according to the present invention;

FIGS. 11a–11c are lateral, front elevational and cross sectional views, respectively, of a cap according to the present invention;

FIG. 12 is a lateral view of the assembled device of FIG. 1 after insertion into an associated support opening;

FIG. 13 is a sectional view of the assembled device and support of FIG. 12 taken along the line VIII—VIII of FIG. 12;

FIG. 14 is an enlarged view of a portion of FIG. 13 showing section Y;

FIG. 15 is a lateral view of the fully assembled device according to the present invention;

FIG. 16 is a lateral view of the fully assembled device according to the present invention after insertion into a support opening;

FIG. 17 is a cross sectional view of the fully assembled device shown in FIG. 15;

FIG. 18 is an enlarged view of a portion of FIG. 17 showing section X;

DETAILED DESCRIPTION OF THE PREFERRED EMBODIMENTS

Figure 1:
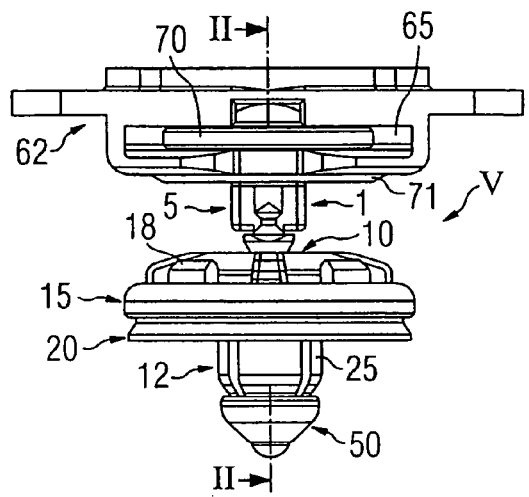
FIG. 1 is a schematic lateral view of a device according to the preferred embodiment of the present invention in a state of pre-assembly.

With reference to FIGS. 1–4 and 21, the preferred embodiment of the invention is shown of a device for connecting a support, for instance, a body part of a motor vehicle with a panel element, especially a door or wall paneling. An exemplary support 2 is shown in FIG. 12, however, an exemplary panel element is not shown. The device is preferably made of plastic.

The preferred embodiment comprises a connecting element 1, shown in more detail in FIG. 7, an intermediate part 15, shown in FIG. 8, a sealing element 20, shown in FIG. 9, an engaging element 12, shown in FIG. 10 and a cap 50, shown in FIG. 11. The connecting part 1 has two flanges 70 and 71, positioned at a distance from each other, which interact, for example, with a locking elements 62, shown in FIGS. 5–6. In other words, the flanges can be inserted therein.

With reference next to FIGS. 7a–7c, an intermediate section 5 of the connecting element 1 comprises a first region I and a second region II of the locking elements 10, whereby the first region I and the second region II are separated from each other by an intermediate neck 28. The aforementioned first and second regions respectively comprise circumferential grooves 34 and 32.

Figure 2:
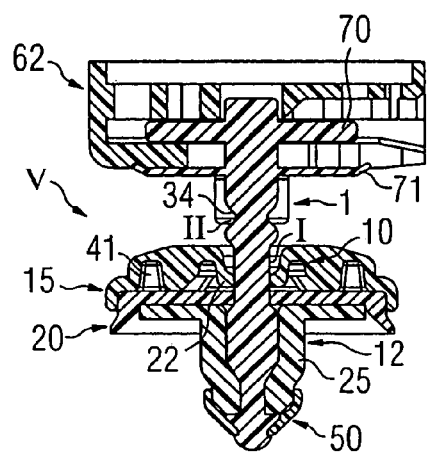
FIG. 2 is a sectional view along the line II—II of the device shown in FIG. 1.
Figure 3:
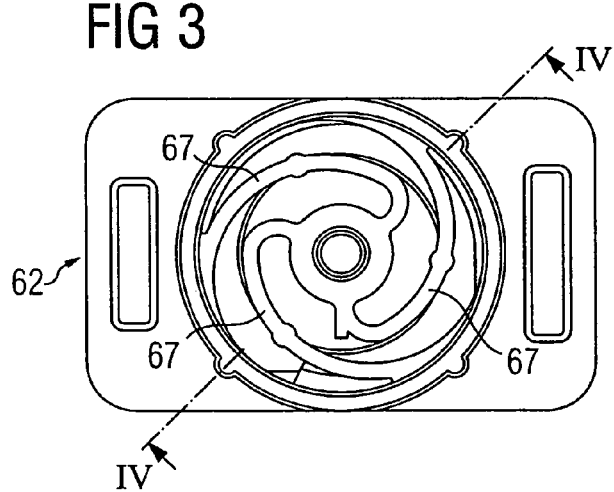
FIG. 3 is front elevational view of the device shown in FIG. 1.
Figure 4:
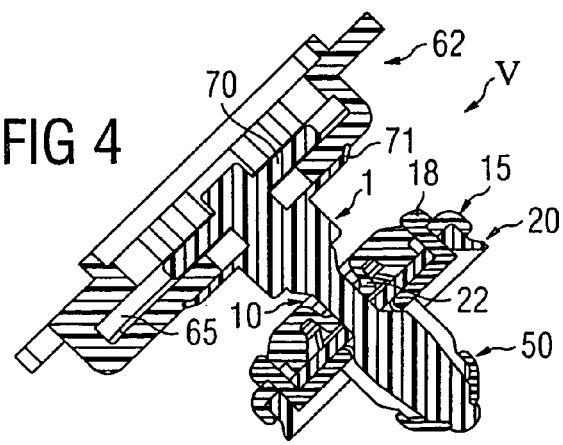
FIG. 4 is a sectional view of the device shown in FIG. 1 taken along the line IV—IV of FIG. 3.
Figure 19:
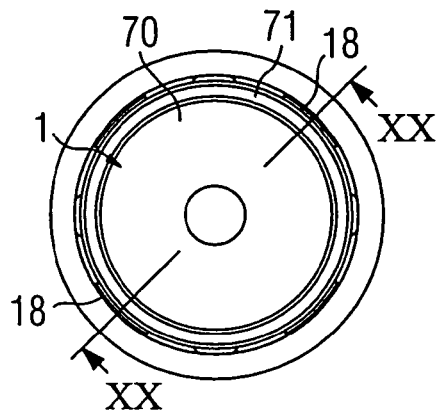
FIG. 19 is a front elevational view of the device according to the present invention.
Figure 21:
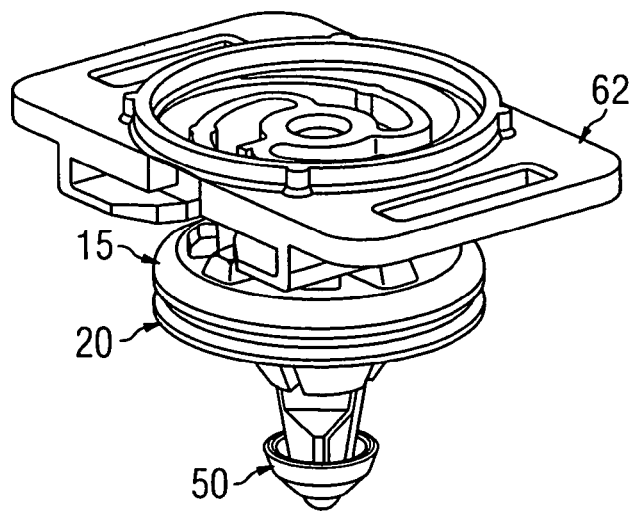

In the pre-assembled state V according to FIGS. 2, 12 and 13, the first region I of the locking elements 10 is locked with counter-locking elements 22 of the intermediate part 15, FIG. 8, while in the post-assembly state E, FIGS. 15 and 21, the second region II undergoes locking with the same counter-locking elements 22 of the intermediate part 15. Concurrently, in the post-assembly state E, the spreader elements 25 of the engaging element 12 are spread apart through the end region 4 of FIG. 8c, of the connecting element 1 in the area of the support opening 7 as depicted in FIG. 17.

The pre-assembled unit V is equipped, according to FIGS. 1–4, with locking elements 62 which is illustrated in more detail in FIGS. 5 and 6. The locking elements 62 have a slot 65 which is configured to receive the upper flange 70 of the connecting element 1. The lower flange 71 is simultaneously received at the underside of the locking elements 62. On the top side of the locking elements 62 are several, spirally extending retaining ribs 67.

In FIGS. 7a–7c, the connecting element 1 is shown in detail in lateral view, front elevational view and cross sectional view respectively. As is apparent, the first region I, i.e. groove 32, of the locking elements 10 and the second region II, i.e. groove 34, are separated from each other by an intermediate neck.

On the underside of the locking elements 10, the groove 32 is adjacent to a flat surface 59, so that in cross-section a square exists in the described region, which serves as safeguard against twisting, so that the locking protrusions 22 can also be cleanly embedded there.

The level surfaces are adjacent to four sloping surfaces 57, which pass over into embedment regions 55. In the area of the embedment regions, cross-pieces 24 are provided. Cross-pieces 30 are provided in the area above the groove 34.

The lower part 4 of the connecting element 1, which delimits the embedment regions 55, is equipped with a locking component 52.

In FIGS. 8a–8c, and in section C—C, the intermediate part 15 is depicted in detail. The intermediate part 15 is preferably formed in the shape of a disc, with a central region containing counter locking elements 22, with slots 31 arranged between each of the locking elements, FIG. 8, in the region of a passage opening 36 for the intermediate region 5 of the connecting element 1. In addition, a circumferential region is provided with diagonally opposite recesses 38, which serve as locking components for the stop catches 18. Between the recesses 38 of the intermediate part 15 are disposed engagement regions 33 for embedding at least one tongue 41 of the sealing elements, depicted in more detail in FIG. 9.

In the pre assembled state, the first region I, i.e. groove 32 of the locking elements 10 is locked with the counter locking elements 22 of the intermediate part 15 (FIG. 14). In assembled state E, on the other hand, the counter locking elements 22 of the intermediate part 15 engage in the second region II, i.e. in the circumferential groove 34 of the connecting element 1 (FIG. 18).

In FIGS. 9a–9b, and in section C—C, the previously mentioned sealing element 20 is depicted in more detail. It is preferably a rubber disk, having at least one tongue 41 and four diagonally opposing passage openings 21, as well as one center opening.

Figure 20:
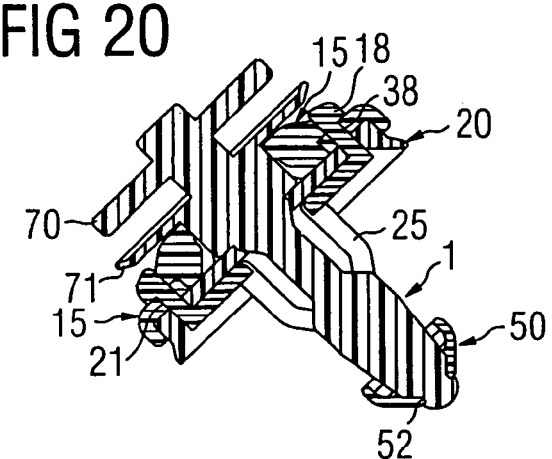
FIG. 20 is a sectional view taken along the line XX—XX of the device shown in FIG. 19; and, FIG. 21 is a top isometric perspective view of the fully assembled device according to the present invention.

FIG. 10 depicts the engaging element 12 in a lateral view, a front elevational view and a C—C section view. The engaging element 12 presents, for example, four diagonally opposing cross-pieces 18, which grab behind the recesses 38 of the intermediate part 15, as shown in FIG. 20, and which are locked behind the recesses.

On the reverse side, the engaging element 12 has, for example, four diagonally opposing spreader elements 25, which taper in conical fashion and are separated from each other by slots. The spreader elements 25 of the engaging element 12 embed themselves according to FIG. 2 and FIG. 7, for example, in the embedment regions 55 of the connecting element 1, that is to say in pre-assembled state V.

In the assembled state E, on the other hand, the spreader elements 25 are spread apart via slopes 57 of the connecting element 1 and are positioned against the four flat surfaces 59 of the connecting element 1, resulting in a situation as depicted in FIG. 17. Thus, the entire device is locked in the support opening 7 of the support 2 in a functionally secure manner.

FIG. 11 depicts the cap 50 in a lateral view, a top elevational view and a section C—C view. The cap 50 has a passage opening 51 and can be locked with the lower part 4 of the connecting element 1, as shown also according to FIGS. 1, 2, 4, 12, 17 and 20. The circumferential regions of the cap 50 thereby enclose, according to the aforementioned Figs., in the pre-assembled position F, the lower, outer regions of the spreader elements 25 of the engaging element 12. After assembly into the assembled state E, the aforementioned regions, according to FIG. 17, are disposed at a distance from the circumferential surface of the cap 50.

According to FIG. 12, the preferred embodiment of the device according to the present invention is adapted for insertion during the pre-assembly stage V in the support opening 7 of the support 2. In other words, the spreader elements 25 of the intermediate part 12 are not as yet spread apart. In this position, depicted according to FIGS. 13 and 14, the counter-locking elements 22 of the intermediate part 15, are embedded in the groove 32, i.e. in the first region I of the connecting element 1. Between the underside of the flange 71 of the connecting element 1 and the upper side of the intermediate part 15, there exists a distance according to FIG. 12.

If a pressure P is exerted upon the device according to FIG. 13, the counter-locking elements 22 move from region I into region II of the connecting element 1, as illustrated in FIG. 18. Thus, the counter locking elements 22 are embedded in the groove 34 of the connecting element 1. At the same time, the spreader elements 25 of the engaging element 12 move from the embedment regions 55 via the sloping surface 57 to the flat surfaces 59 of the connecting element 1 and are thus spread apart behind the opening 7 of the support 2. This position is depicted in more detail in FIGS. 17–20. Consequently, the entire device in the post-assembly stage E is essentially perfectly locked in the support opening 7 of the support 2, so that a panel element, for example a wall paneling of a motor vehicle (not shown), is connected in a functionally secure and effective manner via the locking elements 62 with the support 2, for example a door of a motor vehicle.

In the above-described position, the sealing element acts upon the upper side of support 2 and thus seals off in perfect fashion the support opening 7. The entire unit is locked together in a functionally secure manner, irrespective of the thickness of the support 2.

If the device according to the present invention must be disassembled, a pulling force can be exerted on the locking elements 62, whereby the counter-locking elements 22 of the intermediate part 15, exit from the region II of the connecting element 1 and move into region I. At the same time, the spreader effect of the spreader elements 25 is cancelled and these embed themselves once more, according to FIG. 2, into the embedment regions 55 of the connecting element 1. The entire device can thus be removed from the support opening 7, since the outer circumference of the spreader elements 25 is smaller than the outer circumference of the sealing cap 50, as shown in FIGS. 2 and 13.

The device according to the present invention is constructed in a simple fashion and is highly effective, with multiple assemblies or disassemblies being possible without destroying individual components. This produces many benefits including the benefit of precise adjustment of installation and removal forces, giving assurance of finely-tuned synchronization. The aforementioned forces are independent of the thickness of the support material.

The invention has been described above with reference to the preferred embodiments. Obviously, modifications and alterations will occur to others upon a reading and understanding the specification.

What is claimed is:

1. A device fastener for connection with an associated support, with an associated panel element, the device comprising:
   an engaging element adapted to be embedded in an opening of the associated support, the engagement element including a plurality of spaced apart spreader elements, arranged around the engaging element;
   an elongated connecting element generally defing an axis and including an upper part connectable a lower part, and a neck-shaped intermediate region between the upper part and the lower part,
   locking elements located along the intermediate region;
   an intermediate element, surrounding the intermediate region adjacent the associated support and having slots and counter-locking elements adapted to be selectively locked with the locking elements and wherein the intermediate region of the connecting element includes a first region I and a second region II of the locking elements separated by an intermediate neck, in a pre-assembly state, the first region I, and in a final assembly state, the second region II of the locking elements are locked with said counter-locking elements of the intermediate element and that in final assembly E, the spreader elements of the engaging element, in the region of the support opening, are simultaneously spread apart by the lower part of the connecting element;
   a sealing element arranged between the intermediate element and the engaging element, and being configured to act upon the top surface of the associated support; and,
   at least two diagonally opposing first cross-pieces selectively embeddable along said axis into said slots of the intermediate element.

2. The device as set forth in claim 1, wherein the intermediate element is configured in the shape of a disk having a central region with the counter-locking elements and said slots, disposed between the counter-locking elements, in the region of a passage opening for the intermediate region of the connecting element and with a circumferential region with diagonally opposed recesses.

3. The device as set forth in claim 2, wherein, the engaging element includes, above the spreader elements, third cross-pieces which can be embedded in the recesses of the intermediate element.

4. The device as set forth in claim 3, further including engaging regions between the recesses of the intermediate element for embedding at least one tongue of the sealing element.

5. The device as set forth in claim 4, wherein the sealing element includes passage openings for the spreader elements of the engaging element.

6. The device as set forth in claim 1, further including a cap attached at the end of the lower part of the connecting element.

7. The device as set forth in claim 6, wherein the cap is clipped into a catch of the lower part.

8. The device as set forth in claim 7, wherein the lower part of the connecting element includes embedment regions adjacent the catch adapted to receive the spreader elements of the engaging element which the device is in a preassembled state.

9. The device as set forth in claim 8, wherein the embedment regions of the lower part of the connecting element are separated from each other by second cross-pieces.

10. The device as set forth in claim 9, wherein the embedment regions of the lower part are followed, opposite the catch, by conically tapering sloping surfaces for spreading apart of the spreader elements of the engaging element when the connecting element is moved from the pre-assembled state to a final-assembly state.

11. The device as set forth in claim 10, wherein, in the final-assembly state, the spread apart spreader elements abut a plurality of flat surfaces of the lower part of the connecting element.

12. A fastener for connection with an associated support, the fastener comprising:
   an engaging element including a plurality of spreader elements arranged on the engaging element and being selectively embeddable in an associated opening of the associated support;
   an elongate connecting element generally defining an axis and including:

an upper part,
a lower part linkable with the support; and
a neck-shaped intermediate region between the upper part and the lower part and extending thrbugh the engaging element;
locking elements including a first region and a second region disposed along the intermediate region;
an intermediate element defining slots and carrying counter-locking elements, the intermediate element surrounding the intermediate region adjacent the associated support, adapted to be locked with the locking elements wherein in a pre-assembled state of the device, the first region and in a final-assembly state, the second region of the locking elements is locked With said counter-locking elements of the intermediate element and in the final assembly the spreader elements of the engaging element are simultaneously spread apart through the end region of the connecting element in the region of the support opening;
a sealing element arranged between the intermediate element and the engaging element and configured to act upon the top surface of the support, wherein the first and the second region of the locking elements respectively define circumferential grooves;
an intermediate neck spaced from the first and the second region of the locking elements; and
at least two mutually opposed first cross-pieces which are selectively embedded in the final assembly along said axis into said of the intermediate element.

13. The fastener as set forth in claim 12, wherein:
the intermediate element is disk-shaped and includes a central region with the counter-locking elements and the slots, disposed between the counter-locking elements, in the region of a passage opening for the intermediate region of the connecting element and with a circumferential region with diagonally opposed recesses; and,
the engaging element includes, adjacent the spreader elements, third cross-pieces adapted to be embedded in the recesses of the intermediate element, and including engaging regions disposed between the recesses of the intermediate element, for embedding at least one tongue of the sealing element in the preassembled and the final-assembly states, and wherein the sealing element includes passage openings for the spreader elements of the engaging element.

14. The fastener as set forth in claim 12, further including a cap attached at the end of the lower part of the connecting element.

15. The fastener as set forth in claim 14, wherein the cap is clipped into a catch of the lower part.

16. The fastener as set forth in claim 15, wherein the lower part of the connecting element includes embedment regions adjacent the catch for the spreader elements of the engaging element in the pre-assernbled state.

17. The fastener as set forth in claim 16, wherein the embedment regions of the lower part of the connecting element are separated from each other by second cross-pieces.

18. The fastener as set forth in claim 17, wherein the embedment regions of the lower part are followed, opposite the catch, by conically tapering sloping surfaces for spreading apart of the spreader elements of the engaging element when the connecting element is moved from the pre-assembled state to the final-assembly state.

19. The fastener as set forth in claim 18, wherein, in the final-assembly state, the spread apart spreader elements abut a plurality of flat surfaces of the lower part of the connecting element.

20. A method of connecting a fastener with an associate immediately support comprising:
providing: a fastener including an embeddable engaging element;
a connecting element including an upper part, a lower part linkable with the support, and a neck-shaped intermediate region between the upper part and the lower part and extending through the engaging element;
locking elements located along the intermediate region; at least two diagonally opposing first cross pieces
an intermediate element comprising counter-locking elements and surrounding the intermediate region adjacent the support adapted to be locked with the locking elements and defining slots adapted to receive said cross pieces;
the intermediate region of the connecting element including a first region and a second region of the locking elements;
a sealing element arranged between the intermediate element and the engaging element, the sealing element configured to act upon the top surface of the support;
the first and the second regions of the locking elements are respectively defined as circumferential grooves; and
an intermediate neck separating the first and the second region of the locking elements;
inserting said. embeddable engaging element in a support opening of the associated supportalong an axis of the connecting element, the engaging element including a plurality of spreader elements arranged separated from each other around the engaging element;
positioning the engaging element in said support opening provided in the support;
penetrating the connecting element through the support opening; and,
applying a pressure to the connecting element into the engaging element through the support opening, moving the connecting element from a pre-assembly state to a final-assembly state wherein in the preassembly state, the first region and in the final-assembly state, the second region of the locking elements being locked with counter-locking elements of the intermediate element, and in the final-assembly state, the spreader elements of the engaging element are simultaneously spread apart through the end region of the connecting element in the region of the support opening and said at least two cross-pieces are received in said slot along said axis of insertion.

* * * * *

UNITED STATES PATENT AND TRADEMARK OFFICE
CERTIFICATE OF CORRECTION

PATENT NO. : 6,984,096 B2
DATED : January 10, 2006
INVENTOR(S) : Willibald Kraus It is certified that error appears in the above-identified patent and that said Letters Patent is hereby corrected as shown below:

Column 5,
Line 52, delete "device fastener" and substitute -- fastener device --;
Line 53, delete "with an associated panel element,";
Line 53, insert -- fastener -- before "device";

Column 8,
Line 11, delete "associate" and substitute -- associated --;
Line 12, delete "immediately"; and,
Line 56, delete "slot" and substitute -- slots --.

Signed and Sealed this

Eighteenth Day of April, 2006

JON W. DUDAS
*Director of the United States Patent and Trademark Office*